No. 706,175. Patented Aug. 5, 1902.
O. B. H. HANNEBORG.
EXCAVATOR.
(Application filed Feb. 3, 1902.)
(No Model.) 5 Sheets—Sheet 1.
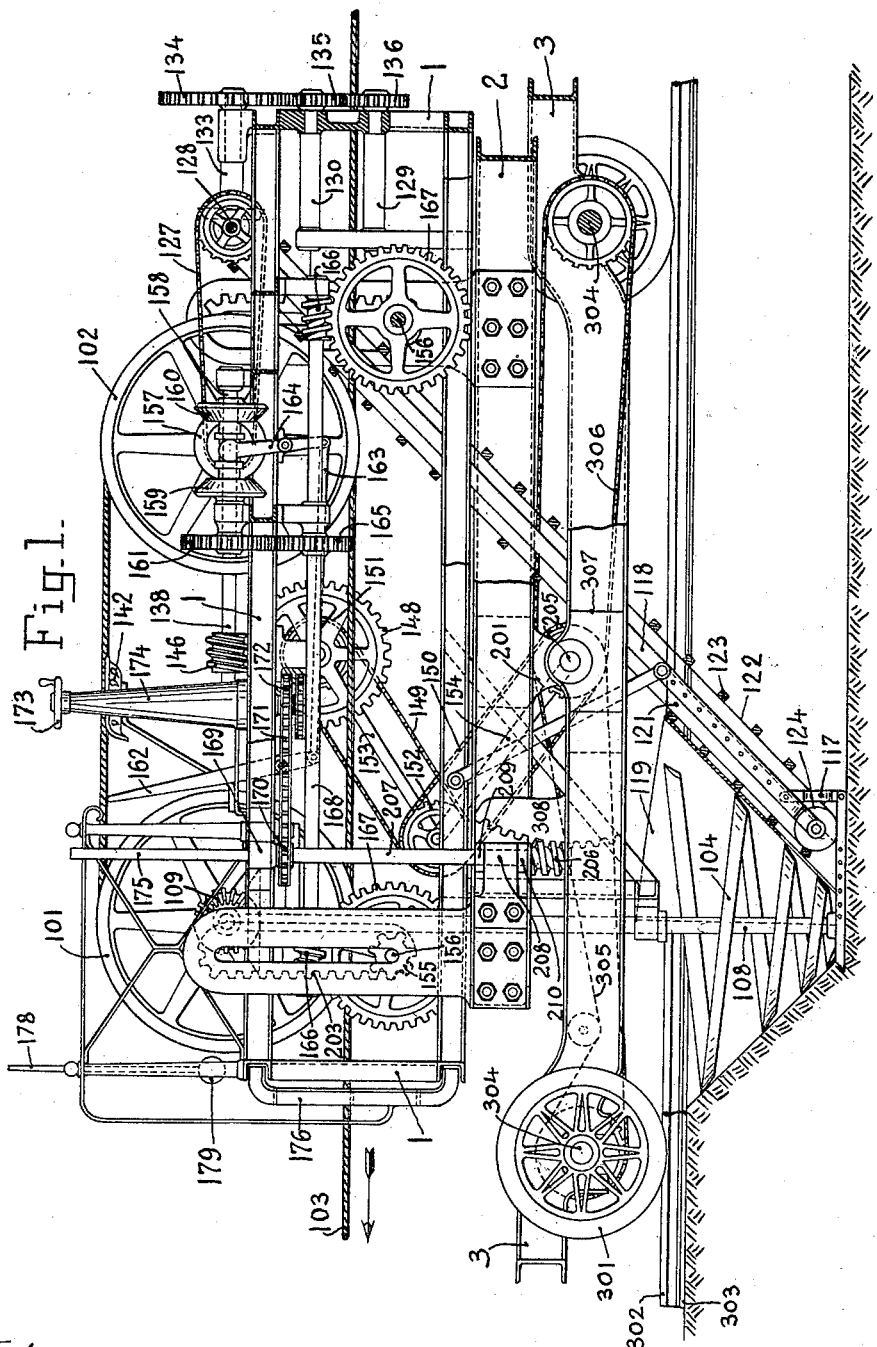
Witnesses:
Isabella Waldron
Adelaide Claire Gleason
Inventor:
O.B.H. Hanneborg.
By: Richards & Co
Attorneys

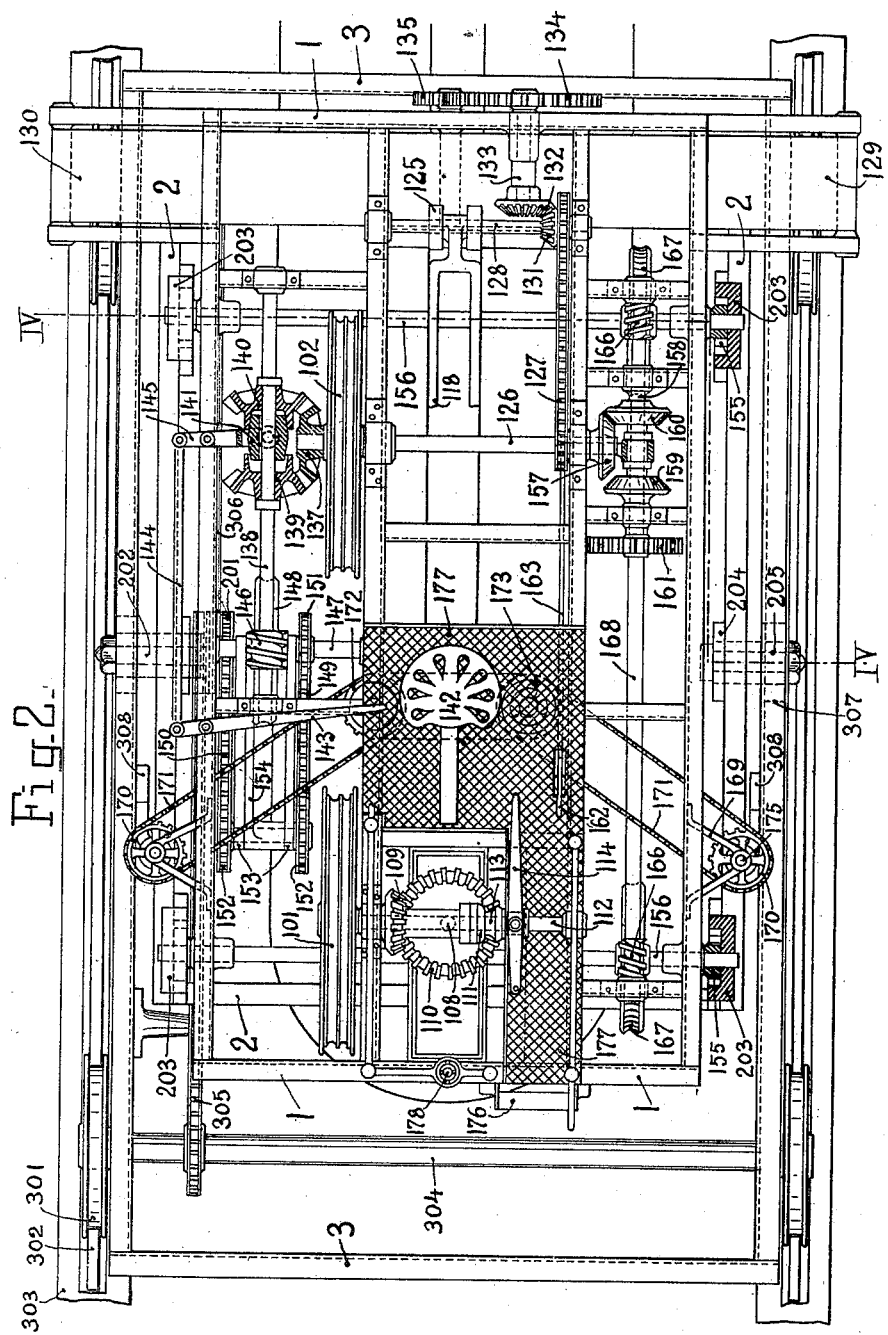

No. 706,175.  
O. B. H. HANNEBORG.  
EXCAVATOR.  
(Application filed Feb. 3, 1902.)  
Patented Aug. 5, 1902.
(No Model.)  
5 Sheets—Sheet 3.
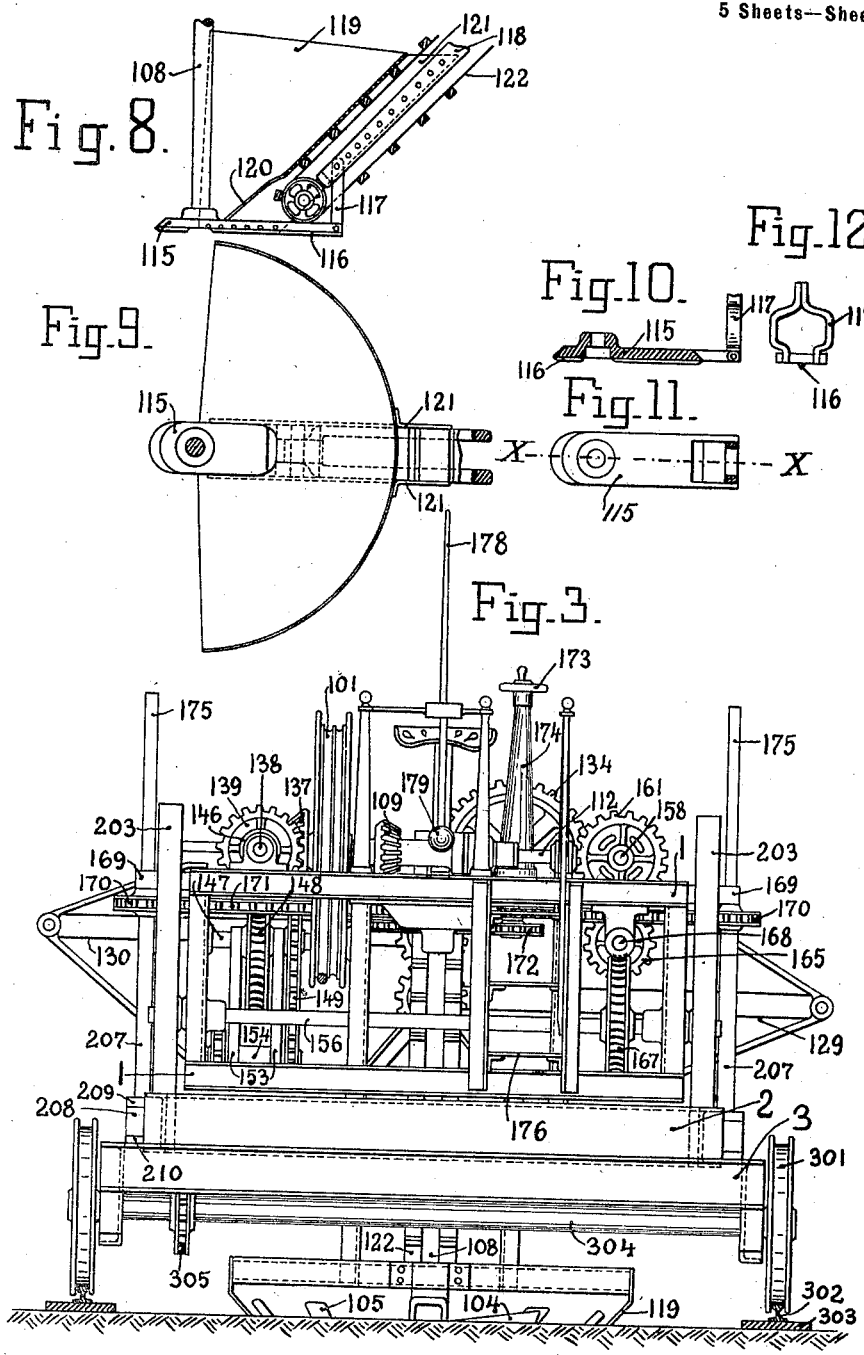
Witnesses  
Isabella Waldron  
Adelaide Claire Gleason
Inventor  
O. B. H. Hanneborg.  
by Richards & Co  
Attorneys No. 706,175. Patented Aug. 5, 1902.
O. B. H. HANNEBORG.
EXCAVATOR.
(Application filed Feb. 3, 1902.)
(No Model.) 5 Sheets—Sheet 4.
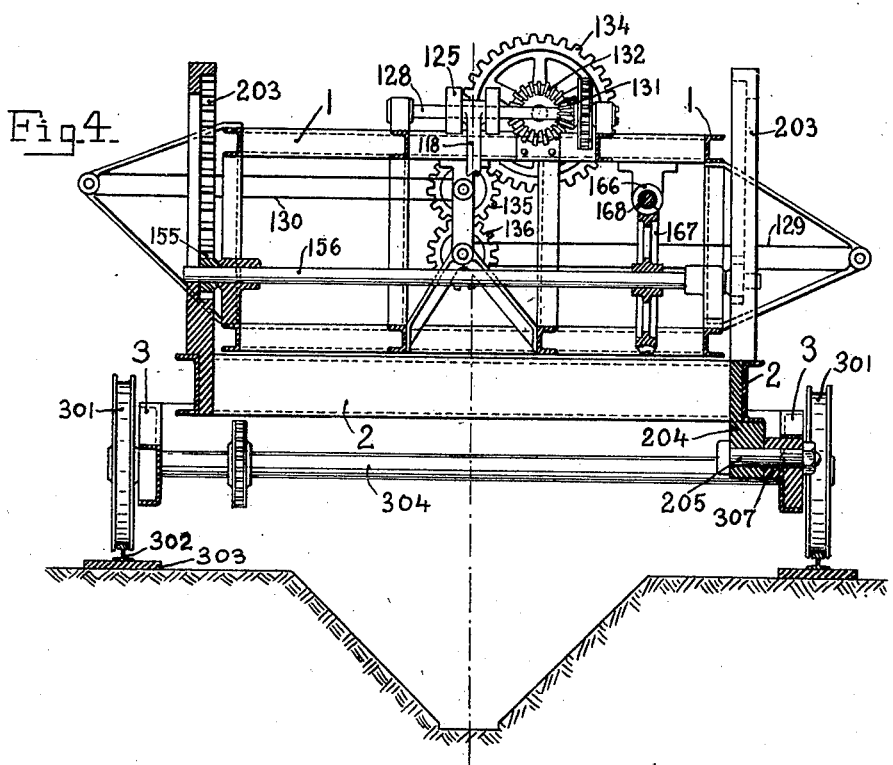
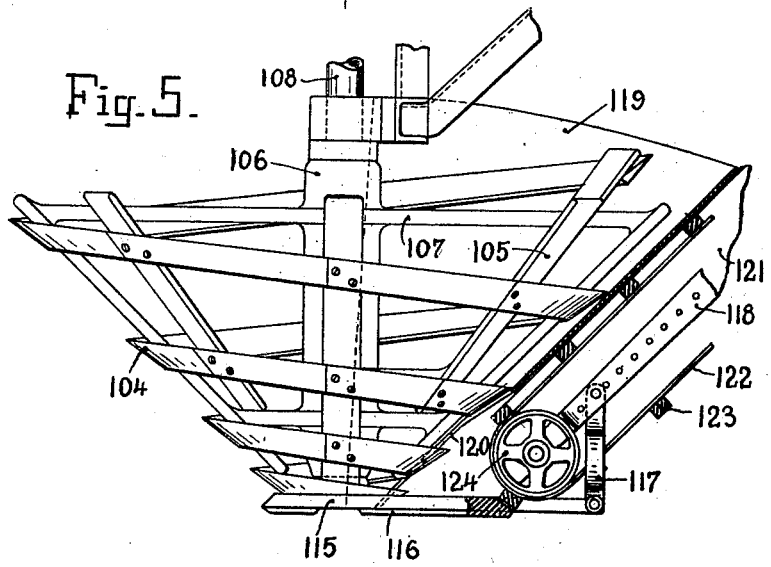
Witnesses
Isabella Waldron
Adelaide Claire Gleason
Inventor:
O. B. H. Hanneborg.
by Richards & Co
Attorneys No. 706,175. Patented Aug. 5, 1902.
O. B. H. HANNEBORG.
EXCAVATOR.
(Application filed Feb. 3, 1902.)
(No Model.) 5 Sheets—Sheet 5.
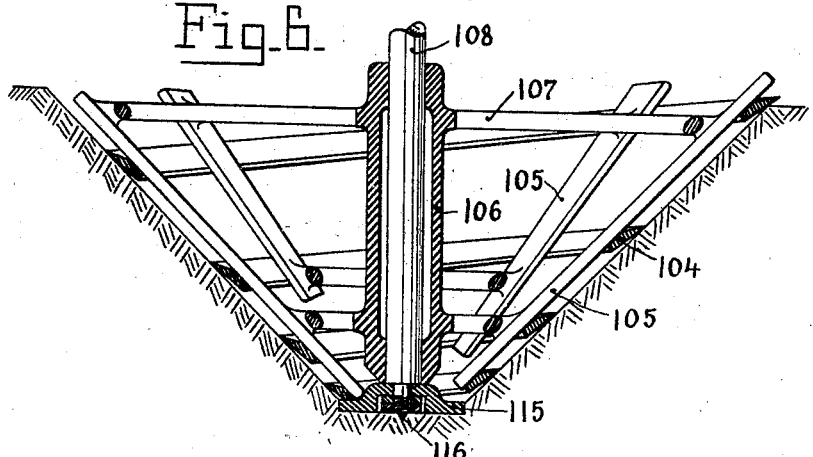
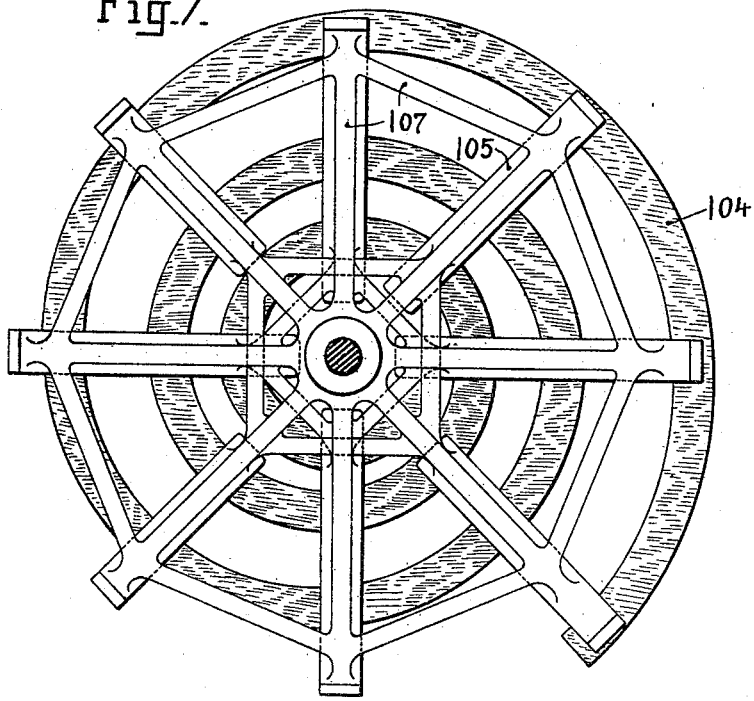
Witnesses:
Inventor
O. B. H. Hanneborg
by Richards & Co
Attorneys

UNITED STATES PATENT OFFICE.

ODILON BALTZAR HANNIBAL HANNEBORG, OF CHRISTIANIA, NORWAY.

EXCAVATOR.

SPECIFICATION forming part of Letters Patent No. 703,175, dated August 5, 1902.

Application filed February 3, 1902. Serial No. 92,362. (No model.)

*To all whom it may concern:*

Be it known that I, ODILON BALTZAR HANNIBAL HANNEBORG, estate owner, a subject of the King of Sweden and Norway, residing at Uranienborgveien 2, Christiania, Norway, have invented certain new and useful Improvements in Excavators, of which the following is a specification.

The present invention relates to an excavating-machine of the kind in which the earth is excavated by means of a screw which is placed on a machine driven by a traction-engine or the like.

The novelty of the invention consists principally in the aforesaid screw forming a comparatively narrow cutter, which winds around the vertical rotating axis with greater or less conicity, like a screw-thread, in such a manner that between the axis and the cutter itself there is a correspondingly-conical space. This space receives the earth cut by the edge of the cutter. This earth falls down to the bottom of the screw and from thence is conveyed to the surface of the ground by a suitable conveyer. A machine of this kind is specially adapted for excavating old ditches; but it can also be employed for cutting new ditches. This machine, like the excavating-machines previously patented by me, has also three frames placed one inside the other; but these frames are differently constructed here, and as the machine runs on rigid rails the various mechanisms of movement are also of a different kind.

The new excavating-machine is illustrated in the accompanying drawings, in which—

Figure 1 is a side elevation of the machine, partly viewed from the outside and partly in section. Fig. 2 is a plan of the machine with portions in section. Fig. 3 is a front elevation of the same. Fig. 4 is a section of the machine chiefly on the line IV IV of Fig. 2. Fig. 5 illustrates the screw cutter from the outside with lower parts of the conveyer. Fig. 6 is a central vertical section through the screw cutter and the part supporting it. Fig. 7 is a plan view of Fig. 6. Fig. 8 illustrates the arrangement of a plate for collecting the earth and also the connection between the conveyer and the cutter-shoe. Fig. 9 is a plan view of Fig. 8. Fig. 10 is a central section on the line X X of Fig. 11. Fig. 11 is a plan view of the cutter-shoe. Fig. 12 shows in end view the connecting-piece between shoe and transporter-bar.

The earth is excavated by a rotary cutter, the edge of which runs in a conical spiral line or in a spiral, the diameter of which increases upward. The earth loosened by the cutter is collected behind the latter by a collecting-plate and is conveyed out of the trench up to a suitable height by a transporting mechanism, the earth being distributed on two transporter-bands in order to be conveyed to a suitable distance on both sides from the edges of the trench. The cutter itself is attached to an axle, which is rotatable.

The machine consists of three frames 1, 2, and 3. The lowest frame 3 forms the supporting part of the machine and is placed on wheels 301, which run on the rigid rails 302. The rails are laid in the field on a wooden or the like support 303, Figs. 1 to 4. The upper frame 1 bears the spiral cutter and can be moved up with it to the intermediate frame 2, which latter is pivoted on a transverse axle 205 on the frame 3.

The machine is driven by an engine, and the power is transmitted by an endless rope 103, Fig. 1, to two driving-wheels 101 and 102. The traction-engine is anchored at one end of the field, and the rope 103 passes from its driving-wheel over the wheels 101 and 102 and then to a tension-wheel at the other end of the field and finally back to the engine.

The spiral cutter 104 is firmly screwed to inclined bars 105, which bars are connected by arms 107 to a hub 106. The hub is keyed on a vertical axle 108, which is supported by the upper frame 1 and receives motion from the wheel 101 by means of bevel-gearing 109 and 110. The hub of the bevel-wheel 109 is prolonged at one end into a sleeve, which forms a conical hollow cylinder 111, Fig. 2. This cylinder corresponds with a cone 113, keyed on the axle 112 of the wheel 101. This friction-coupling for coupling together the axle 112 and the gearing 109 can be thrown in gear by means of the handle 114, whereby the axle 108 of the spiral cutter is rotated. In order that the trench or ditch may be given a smooth bottom, a shoe 115, Figs. 5 and 6, is arranged on the lower end of the spiral cutter, which shoe does not follow the rotary movement of the cutter 104, but only the progressive movement forward. This shoe is provided with a cutting edge on its front end and is attached to the lower end of the axle 108, Figs. 5, 6, and 8 to 11. The shoe 115 is prolonged rearwardly and has on the center of the under side a guiding-bar 116, which forms a corresponding furrow at the bottom of the trench and causes the shoe to rest more firmly in place. The shoe is, moreover, prevented from turning aside or from moving aside at its hinder end by two curved pieces 117, which are connected with the supporting-bar 118 of the transporter described below. The earth raised by the rotary and advancing movement of the cutter 104 falls into the tapering space formed inside the cutter and is prevented from falling outside the cutter by a collecting-plate 119. This collecting-plate surrounds the back part of the spiral cutter, leaving the front half thereof free, Figs. 8 and 9. The loosened earth can fall out through a hole 120 in the back of the plate 119 down on the shoe. The plate 119 is provided on the outer side with two smaller plates 121, which pass upward at a distance apart equal to the width of the trench at the bottom of the outer sides of the plate 119. In the space between the plates 121 runs the transporter 122, which conveys away the earth which falls out through the hole 120. The transporter fits closely to the plates 121, which prevents the earth falling back into the trench. The transporter consists of an endless band 122, provided with ridges 123, which is stretched over pairs of rollers 124 and 125, the latter pair being driven by the axle 126 of the wheel 102 by means of a chain 127 and sprocket-wheel. The rollers 124 are placed at one end of a bar 118, the other end of which receives the axle 128 of the rollers 125.

The earth is conveyed, by means of the ridges 123, up to the rollers 125 and falls down on two transporting-bands 129 130, which convey the earth to the sides, so that it is left lying alongside the trench on both sides at a suitable distance from the brink, Figs. 1 to 4. The transporting-bands 129 and 130 are moved by the shaft 128, which by means of the bevel-gearing 131 132, the axle 133, and the gearing 134, 135, and 136 drives the bands in opposite directions. By setting up the frame 1 on the intermediate frame 2 the cutter 104 can be raised or lowered, according to the depth of the ditch or trench, and if the machine is to excavate on an incline the axis of the cutter must be kept constantly vertical, which is effected by the aforesaid pivoting of frame 2, together with frame 1, on the frame 3. The advancing movement is derived from the axle 126 of the wheel 102 and transmitted to the axle 304 of the wheels of the third frame 3. To one end of the axle 126 is keyed a bevel-wheel 137, Figs. 2 and 3, which engages with two bevel gear-wheels 139 and 140, loosely set on a longitudinal axle 138. These two latter gear-wheels therefore always rotate in opposite directions and are provided on the sides turned toward each other with a friction-ring. Between these bevel-wheels is placed a double beveled coupling-box 141, Fig. 2, which can be brought into engagement from the seat 142 by means of the arm 143 and the connecting-rods 144 145 with one or other of the friction-rings. As the coupling-box 141 is placed movably on the axle 138, while the gear-wheels 139 and 140 are loosely set on the same axle, it is obvious that according to whether the handle 143 is moved in one or the other direction movements of opposite direction are communicated through the gearing 137, 139, and 140 to the axle 138. The axle 138 is provided with a worm 146, which engages with a worm-wheel 148, placed on a transverse axle 147, arranged in the frame 1, whereby the axle 147 is set in rotation.

The movement is transmitted by the axle 147 by means of chains 149 150 and sprocket-wheels 151, 152, and 201 to the axle 202, Fig. 2, on which the frame 2 is pivoted, to the frame 3. The sprocket-wheel 201 is cast together with two other gear-wheels, which by means of chains 305 and 306 transmit motion to the axles 304 of the wheels, Figs. 1 and 2.

In order that the rotary motion may be transmitted without disturbing influences from the wheel 151 to the wheel-axles 304 during the moving up of the frame 1 and the swinging of the frame 2, the wheels 152 are placed between one end of two bars 153 154, the other ends of which receive the axles 147 and 202. The bars 153 and 154 are of the same length, and the axles 147 and 202 lie approximately in the same vertical plane.

The moving up of the frame 1 to the frame 2 is effected by means of gearing 155 155 155 155, which engage with four suitable vertical toothed racks 203 203 203 203, firmly connected with the frame 2, and which placed in pairs on the axles 156 156 can be driven in one or the other direction by the driving-wheel 102. For this purpose a bevel friction-wheel 157, Figs. 1 and 2, is keyed on one end of the axle 126 of the driving-wheel 102, and at the same height as the axle 126, but lengthwise of the machine, is placed a short axle 158. This latter is provided at one end with two bevel friction gear-wheels 159 and 160, fixed to a sleeve, and at the other end with a toothed wheel 161. The friction gear-wheels are, with their sleeve, keyed to the axle 158; but they can be moved on the axle from the seat 142 by means of a handle 162 and connecting-rods 163 164, so that the motion of the friction-wheel 157 can be transmitted to one or other of the friction gear-wheels 159 or 160, whereby the axle 158, with toothed wheel 161, can be turned in one or the other direction. Under the axle 158 and parallel with it is lodged an axle 168, which is provided with a gear-wheel 165 (in engagement with the gear-wheel 161) and at each end with a worm 166 166, which engages with worm-wheels 167 167 on the axle 156 of the gearing 155. It is obvious that the movement of the wheel 102 is transmitted by the friction-wheel 157, the gear-wheel 159 or 160, the axle 158, the toothed wheels 161 165, the axle 168, the worms 166, the worm-wheels 167, and the axles 156 to the gearings 155, which will all rotate to exactly the same angle, and thereby raise or lower the frame 1 relatively to the intermediate frame 2.

As mentioned above, the axle 108 of the cutter when the machine works on an incline is placed vertical, so that the frame 2, with the frame 1, is swung around a transverse axle on the frame 3. For this purpose the frame 2, which entirely supports the frame 1, is provided about the center with a bearing 204, Fig. 4, and a corresponding bearing 307 is attached to the frame 3. Through these bearings is passed a bolt 205 or 202, on which the aforesaid oscillation or swinging takes place. This arrangement is the same on both sides, only the bolt 202 is prolonged on one side (where the motion is transmitted to the axles of the wheels by the sprocket-wheels 201) to the inner side, and there bears the said sprocket-wheel, Fig. 2. A worm-wheel segment 308, Figs. 1 and 2, is attached to both the inner sides of the frame 3, which segment engages with a worm arranged on a vertical axle 207. This axle is revoluble, with one of its ends in a bearing 208, Figs. 1 and 3, attached to the frame 2, and is prevented by collars 209 and 210 from moving lengthwise and is placed with its other end in a projecting piece 169, Figs. 1, 2, and 3, attached to the frame 1. Directly underneath this piece 169 is placed on the axle a sprocket-wheel 170, which is held fast by the piece in such a manner that it can only rotate with the axle 207, but not follow its longitudinal movement when the frame 1 is raised up. For this purpose the axle 207 bears on its upper end a piece 175, which is provided along its whole length with a groove, and the sprocket-wheel 170 has a catch which corresponds with said groove. By means of the sprocket-wheels 170, chains 171, sprocket-wheels 172 the two axles 175 207 can be turned, by means of the hand-wheel 173, simultaneously to the same angle, whereby the worms 206, which are in engagement with the segments 308, cause the frame 1 to balance on the frame 3. The hand-wheel 173 is arranged on an axle which is placed in a shaft 174 within reach of the driver seated on the seat 142.

On the front of the frame 1 is placed a ladder 176, by which to mount to the platform 177, Fig. 2.

In order that the driver seated on the seat 142 can exactly control the direction in which the excavator digs, the trench is marked out in the field by pegs and a pointer 178 placed on the front of the machine, which is suspended like a compass in two rings and always adjusts itself vertically, owing to a weight 179 on its lower end, Figs. 1, 2, and 3.

A level may also be placed on the platform of the machine, according to which the frame 1 can be placed horizontal on slopes. The platform is surrounded by a railing.

When the machine begins to excavate, the cutter or frame 1 is adjusted so high that the cutter-shoe 115 only touches the ground. At the same time the frame 1 is set slightly sloping by means of the hand-wheel 173. The cutter is then set in rotation by means of the handle 114, and finally the machine is set in progressive motion by means of the handle 143. At the same time the driver holds the handle 162 and causes the frame 1, with the cutter, to move slowly down while the machine moves forward. As soon as the cutter in this manner has dug down to the desired depth the frame 1, with the cutter-axle 108, is placed vertical and the handle 162 brought into the position of rest. From this moment the excavator operates in the ordinary manner. As soon as the machine slopes a little it is instantly indicated by the level and the axle of the cutter is adjusted by the handle 173.

This machine allows of being easily operated and only requires one man to work it, who can control the machine in every respect from the seat 142. It is obvious, moreover, that the invention is not merely limited to the application of a spiral cutter, such as is illustrated in the drawings, but that the cutter may be in the form of a cone, with greater or less conicity, or even in the form of a cylinder, according to the desired form of the trench.

Having now described my invention, what I claim as new, and desire to secure by Letters Patent, is—

1. In an excavator of the class described, a screw digger consisting of a comparatively narrow cutter which winds in a spiral with more or less conicity around a vertical rotatable axle, and has a corresponding conical space between the said axle and cutter which receives the earth excavated by the cutter-blade, the earth falling down to the bottom of the screw, means for conveying the excavated material from the bottom of the screw to the surface of the field and a collecting-plate surrounding the rear of the screw and having an exit-opening for the dirt, substantially as set forth.

2. In an excavator substantially as set forth, the combination with the spiral cutter 104 and the collecting-plate 119 having a hole 120 of a transporter 122, 123 two plates 121 fixed to the collecting-plate between which the transporter runs, two horizontal transporting-bands 129, 130, receiving the earth from said transporter whereby the earth is conveyed out of the trench and heaped up at both sides thereof, substantially as described.

3. In an excavator as set forth the combination with the spiral cutter and the axle bearing the cutter of a shoe 115 which has a guide-bar 116 running along the center underneath the shoe being prolonged to the rear and prevented from tipping up by a curved piece 117, substantially as described.

4. In an excavator as set forth, the combination with the spiral blade of inclined placed bars 105 supporting said cutter, said bars being connected by means of arms 107 with a hub 106 keyed on the axle 108.

5. In a machine of the character described, the combination with the main frame 3, having supporting-wheels, of an inner frame 2, connected thereto by bolts and bearings, worm-wheel segments rigidly secured to said frame 2, vertical shafts having worms meshing with said worm-wheel segments, and means for operating said vertical shafts, substantially as described.

6. In a machine of the character described, the combination with the main frame 3, of a frame 2 mounted to tilt thereon, worm-wheel segments connected to said shaft, vertical shafts having worms meshing with said segments, a third frame supported by said second frame and vertically movable in relation thereto, means for moving said third frame vertically, and gearing carried by the third frame for operating said shafts, said gearing having splined connections with the shafts, substantially as described.

In witness whereof I have hereunto set my hand in presence of two witnesses.

ODILON BALTZAR HANNIBAL HANNEBORG.

Witnesses:
RICHARD STOKKE,
AXEL LAHN.